United States Patent [19]

Gayer et al.

[11] Patent Number: 5,038,971

[45] Date of Patent: Aug. 13, 1991

[54] VARIABLE BLENDING DISPENSER

[75] Inventors: Donald K. Gayer; Ronald H. Barbee, both of Fort Wayne, Ind.

[73] Assignee: Tokheim Corporation, Fort Wayne, Ind.

[21] Appl. No.: 414,444

[22] Filed: Sep. 29, 1989

[51] Int. Cl.$^5$ .............................................. G01F 5/00
[52] U.S. Cl. .......................................... 222/1; 222/28; 222/55; 222/56; 235/94 A
[58] Field of Search ................... 222/26, 27, 23, 25, 222/28, 29, 55, 56, 64, 14, 71, 132, 134, 135, 144.5, 145, 1; 251/30.1, 30.2; 235/94 A

[56] References Cited

U.S. PATENT DOCUMENTS

| | | | |
|---|---|---|---|
| 3,229,077 | 11/1966 | Gross | 235/151.34 |
| 3,272,217 | 9/1966 | Young | 137/101.19 |
| 3,410,293 | 11/1968 | Ernyei | 137/112 |
| 3,473,008 | 10/1969 | Bay et al. | 235/151.12 |
| 3,475,392 | 10/1969 | McCoy | 260/83.7 |
| 3,688,947 | 9/1972 | Reichenberger | 222/27 |
| 3,717,283 | 2/1973 | Gulbrandsen | 222/76 |
| 3,747,624 | 7/1973 | Young | 137/100 |
| 3,756,463 | 9/1973 | Gravina | 222/26 |
| 3,762,428 | 10/1973 | Beck et al. | 137/88 |
| 3,777,935 | 12/1973 | Storey | 222/16 |
| 3,847,302 | 11/1974 | Krone et al. | 222/14 |
| 3,895,738 | 7/1975 | Buchanan et al. | 222/26 |
| 3,907,248 | 9/1975 | Coulbeck | 251/30 |
| 3,934,756 | 1/1976 | Young et al. | 222/28 |
| 3,940,600 | 2/1976 | Alexander et al. | 235/151.12 |
| 4,019,653 | 4/1977 | Scherer et al. | 222/1 |
| 4,043,300 | 8/1977 | Lombard | 123/32 EA |
| 4,083,473 | 4/1978 | Goodwin et al. | 222/144.5 |
| 4,150,767 | 4/1979 | Pitches et al. | 222/23 |
| 4,252,253 | 2/1981 | Shannon | 222/25 |
| 4,262,686 | 4/1981 | Heim et al. | 137/7 |
| 4,265,266 | 5/1981 | Kierbow et al. | 137/101.19 |
| 4,320,775 | 3/1982 | Stirling et al. | 137/3 |
| 4,333,356 | 6/1982 | Bartels et al. | 73/864.21 |
| 4,345,610 | 8/1982 | Herter et al. | 137/7 |
| 4,345,612 | 8/1982 | Koni et al. | 137/101.19 |
| 4,353,482 | 10/1982 | Tomlinson et al. | 222/1 |
| 4,420,008 | 12/1983 | Shu | 137/4 |
| 4,433,701 | 2/1984 | Cox et al. | 137/101.19 |
| 4,440,314 | 4/1984 | Vetter et al. | 222/39 |
| 4,482,969 | 11/1984 | Funk et al. | 364/500 |
| 4,494,209 | 1/1985 | Agarwal | 364/502 |
| 4,527,245 | 7/1985 | Axelson, Jr. et al. | 364/478 |
| 4,538,221 | 8/1985 | Crain et al. | 364/172 |
| 4,538,222 | 8/1985 | Crain et al. | 364/172 |
| 4,876,653 | 10/1989 | McSpadden et al. | 364/479 |

FOREIGN PATENT DOCUMENTS 705559 3/1965 Canada ................................. 222/134
0211612 7/1986 European Pat. Off. ..

Primary Examiner—Michael S. Huppert
Assistant Examiner—Anthoula Pomrening
Attorney, Agent, or Firm—Jeffers, Hoffman & Niewyk

[57] ABSTRACT

The present invention is a variable blending dispenser for fluids, particularly for fuel dispensers. The dispenser controls variable valves according to volumetric data observed by flow meters on input lines to the dispenser, by calculating measuring error as the difference between desired blend ratio and the observed blend ratio calculated from volumes of blend components dispensed. The dispenser successively corrects the settings of the valves after dispensing predetermined volumes, the corrections determined by a volume based PID error function so that the total amount of each blend component is separately and accurately measured while providing the desired blend ratio.

35 Claims, 5 Drawing Sheets

VARIABLE BLENDING DISPENSER

BACKGROUND OF THE INVENTION

The field of the invention is that of blending dispensers for liquids. More particularly, the field is that of blending dispensers capable of dispensing a variety of blending mixes.

In liquid dispensing devices, for example gasoline fuel pumps, different grades of gasolines are conventionally mixed to provide a specific blend. Using two gasoline sources, one supply tank containing gasoline having a first octane rating, for instance, 95, and the other supply tank containing gasoline having another octane rating, for instance, 83, a dispenser can produce gasoline blends having a desired octane rating in the range of 83 to 95. The following example uses 83 and 95 octane gasolines as the component fuels because they represent a common prior art range of octanes; however, a variety of ranges of octanes have been used to mix and provide blends of gasoline. For example, gasolines of various octane ratings can be provided by mixing component gasolines in the following percentages:

| Octane | % of 83 octane | % of 95 octane |
|--------|----------------|----------------|
| 83     | 100            | 0              |
| 87     | 67             | 33             |
| 89     | 50             | 50             |
| 91     | 33             | 67             |
| 95     | 0              | 100            |

It is imperative in such blending dispensers that the component fuels are accurately dispensed to provide the desired blend ratio.

In prior art systems, a proportional control system has been used to check the blending ratio periodically by observing the instantaneous flow rates of the two component streams of fluid (e.g. from the 83 and 95 octane tanks). An electronic controller observes the instantaneous flow rates by receiving signals from pressure sensors coupled to the two flow lines. When the instantaneous flow rates substantially deviate from those needed to provide the desired mixture, the valves which control the component streams are adjusted accordingly. This results in a dispenser which tends to deliver an instantaneous blend ratio equal to the desired mixture only after a significant portion of the desired quantity of fuel has been dispensed, assuming that liquid pressure remains relatively constant. Thus a significant quantity of the dispensed fuel may have an incorrect blend or mixture. However, such proportional control systems only correct for errors in the instantaneous flow rate and do not account for the total errors in fuel which has already been dispensed so that the total amount of dispensed fuel will be a desired blend.

Consider a hypothetical system having 83 octane and 95 octane gasoline which uses a proportional control system to provide a range of gasolines having different cumulative blend ratios (i.e., the amount of 83 octane dispensed divided by the sum of the amount of 83 and 95 octane dispensed). Initially, relatively little of the 83 octane is dispensed compared to the amount of 95 octane dispensed. After periodic checking and correcting of the instantaneous blend ratio, the cumulative blend ratio curve steadies as the dispenser eventually provides an instantaneous blend of approximately 50% of 83 octane fuel and 50% of 95 octane fuel. However, the initial disparity does not enter into the calculation of the instantaneous rates, so that the total quantity of dispensed fuel for the session contains less than the desired 50% of 83 octane fuel. Accounting for the total blend ratio, a steady state error exists created by the initial mixture which contained substantially more 95 octane fuel than 83 octane fuel. The steady state error represents that amount of 95 octane gasoline which exceeds the amount of 83 octane gasoline, and the error can never be eliminated because the instantaneous rates are maintained at the 50% ratio. The cumulative blend ratio does approach the desired cumulative ratio as the amount of fuel dispensed approaches infinity, but the average consumer does not dispense such a large volume of fuel, rather the typical volume of gasoline dispensed by a consumer is between five and ten gallons. Thus, as a practical matter, the steady state error does not substantially decrease for gasoline dispensing applications because of the low volume of dispensing. Additionally, small quantities of dispensed fuel tend to have large errors. Also, random fluctuations of pressure within the proportional control system can add to the steady state error.

For example, assume that an operator or customer desired to put 10 gallons of 89 octane gasoline into the automobile fuel tank. Initially, for some reason, the 95 octane gasoline flowed at a rate four times that of the 83 octane gasoline. After the first gallon, the dispenser had provided 0.2 gallons of 83 octane gasoline and 0.8 gallons of 95 octane gasoline. At the one gallon mark, the dispenser corrected the difference in flow rates, and the remainder of the ten gallons were dispensed in an approximately 50% blend ratio. Thus at the end of the dispensing cycle, the dispenser provided 5.3 gallons of 95 octane gasoline compared to 4.7 gallons of 83 octane gasoline, resulting in a cumulative blend ratio of 4.7/(4.7+5.3) or 47%.

In the same example, assume that immediately after five gallons had been dispensed, the pressure in the 83 octane gasoline line fell dramatically so that only 0.3 gallons were dispensed while 0.7 gallons of 95 octane gas were dispensed. After that dramatic pressure drop, the system then corrected for the pressure differential and dispensed an approximately 50% blend ratio. Thus, at the end of this dispensing, the dispenser provided 5.5 gallons of 95 octane gasoline compared to 4.5 gallons of 83 octane gasoline, resulting in a cumulative blend ratio of 4.5/(4.5+5.5) or 45%.

One form of prior art dispenser uses fixed orifice valves with pressure equalizers to achieve proper blending, generally having a cumulative accuracy of approximately 3%. The size of the orifice for each gasoline determines the instantaneous blend because the pressures are maintained relatively equal by pressure equalizers. However, to provide a blend which does not correspond to specific orifice sizes requires that the valves of the dispenser must be periodically turned on and off. Because the pressure sensors, valves, and pressure equalizers of dispensers are least accurate during starting and stopping, using fixed orifice blenders limits the versatility of the blending dispensers.

In dispensing operations having more than one dispenser for each pair of tanks, which is the usual circumstance, pressure equalizers often cannot perform adequately because of the variable pressures from the supplying tanks. For example, if three dispensers are currently dispensing 95 octane gasoline, and then a fourth dispenser is set to provide 89 octane gasoline, the fluid pressure in the supply line from the 95 octane supply tank should be substantially less than the pressure from the 83 octane supply tank. The resulting imbalance between pressures causes imprecision in accurately providing the desired cumulative blend.

Also, those dispensers tabulate the total amount dispensed, not the individual amounts dispensed from each tank. This can present difficulty to sellers of gasoline who must accurately measure the amount of gasoline withdrawn from each supply tank. Although an estimate of the individual amounts withdrawn are made from the total amount dispensed, additional proving must occur to verify the estimated amounts. Further, to insure that the desired cumulative blend is produced so the octane rating is at least as high as desired, the dispenser is biased in favor of dispensing more of the higher octane, more expensive gasoline.

Another feature of gasoline dispensers is that the operator may choose to dispense the gasoline quickly or slowly by actuating the nozzle handle. Thus, the operator can control the nozzle of the dispenser to change the flow rate or turn the flow on or off at any time. Due to the unpredictability of the operation of the nozzle, the signals sent by the pressure sensors may differ greatly at different times. When the nozzle is off, no flow exists, and the periodic signals sent by the pressure sensors may not present adequate information to make an accurate blend calculation. Thus, prior art dispensers have further problems due to erratic and unpredictable use which further impairs their accuracy.

Thus, a need exists for an improved blending dispenser that avoids the above-mentioned problems and accurately provides a desired cumulative blend. Also needed is a dispenser which separately measures the volume of the component fluids mixed and dispensed. A further need exists for a blending dispenser which adjusts component fluid flows according to the total cumulative volume of flow rather than instantaneous flow rates.

SUMMARY OF THE INVENTION

The present invention is a variable blending dispenser. Variable valves are controlled to provide improved accuracy in a blending dispenser. During each dispensing session, the valves are corrected successively after having dispensed a threshold volume. The correction required is calculated on the basis of the volumes of component fluids dispensed, so that the total amount dispensed of each blend component is measured. Thus, variable blends are efficiently and accurately dispensed.

The control microprocessor of the dispenser checks the amount dispensed once per predetermined time period, but only when a predetermined threshold volume has been dispensed does it perform an error correction. The blend ratio is defined as the ratio, expressed as a percent, of the volume of one of the products dispensed to the total volume of the two products dispensed. The error is calculated by comparing the blend ratio based on the actual volumes dispensed to the desired blend ratio.

In the present invention, only two supply tanks are needed to provide a variety of blends ranging from the octane ratings of the low to the high octane gasolines. Thus a gasoline station needs only two supply tanks to provide a variety of octane blends, rather than one tank for each octane blend dispensed which adds to the cost of the station. Also, because of the expense involved in monitoring the supply tanks for environmental reasons, the cost of maintaining the installation is lowered by accurately and individually measuring the amount of gasoline supplied by each tank. Requiring only two tanks for numerous blends lowers the cost necessary to build a gasoline dispensing installation, and lowers maintenance costs as well. Also, the present invention is adaptable to a variety of sizes of installations, from one dispenser and two small tanks to a multiplicity of dispensers and two or more large tanks. The calibration of the dispenser is not dependent upon the size of its installation, the only dynamically set parameters are the desired cumulative blend ratio and, optionally, the amount of fuel.

The present invention is more accurate than "fixed orifice" blenders because it uses the cumulative volume, that is the volume dispensed since the beginning of the dispensing session, rather than rate to adjust the blend dispensed. Also, piston meters which determine the measurements of the amount of flow are accurate at both slow and fast flow, compared to the accuracy of pressure sensors. While pressure sensor systems require continuous adjustment when the nozzle is turned on and off for short time intervals, the dispenser of the present invention waits a predetermined time before adjusting the valves when the nozzle is intermittently activated. The blending valve of the present invention also functions as the shut off valve.

Additionally, the present invention minimizes wear on valves because only one valve is variably controlled. The present invention maintains one valve fully open and dynamically adjusts the other valve to provide the desired blend ratio. The volume flow through the conduits and the desired blend ratio determine which valve fully opens. The error correction of the present invention takes into account present and past volumes dispensed using a proportional-integral-differential (PID) adjustment algorithm. This PID algorithm bases any error correction on the present (instantaneous) blend position of the valves, the cumulative blend ratio, and the most recent changes to the instantaneous blend ratio. By implementing the PID algorithm with volume rather than time, fluctuations of flow rate caused by extraneous variables, such as nozzle changes, do not complicate the error calculations.

The present invention, in one form thereof, is a dispenser for blending component fluids according to a desired cumulative blend ratio. It comprises fluid conduits, valves, flow meters, an output device, and a control device. The fluid conduits are coupled to supplies of component fluids which are to be dispensed. The valves control the flow rate at which component fluids flow through the conduits. The flow meters are connected to the valves for measuring the volume of component fluid flowing through each conduit and for providing a volume signal. The output device mixes and dispenses the component fluids. The control device controls the blending and dispensing of the component fluids by measuring the volume dispensed with the flow meters and by controlling the volume dispensed with the valves. A comparison device of the control device is used to determine a corrected blend ratio, and a selection device of the control device is used to specify the desired blend ratio. The control device also includes an adjustment device which adjusts the valves in accordance with the corrected blend ratio so the ratio of dispensed fluids is equal to the desired ratio.

One object of the present invention is to provide a dispenser which provides an accurate blend.

An additional object is to provide a dispenser which accurately measures the component fluids of the blend dispensed.

A further object of the present invention is to provide a dispenser which calculates valve adjustments according to the cumulative volumes of component fluids dispensed.

Also, an object of the present invention is to provide a dispenser which uses a PID algorithm to mix and dispense a desired blend.

Yet another object of the present invention is to provide a blending dispenser which does not require a separate shut-off valve.

Furthermore, an object of the present invention is to replace fixed orifice valves with variable valves and pressure sensors with positive displacement piston meters in a dispenser to more accurately measure flow and minimize wear on the valves.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
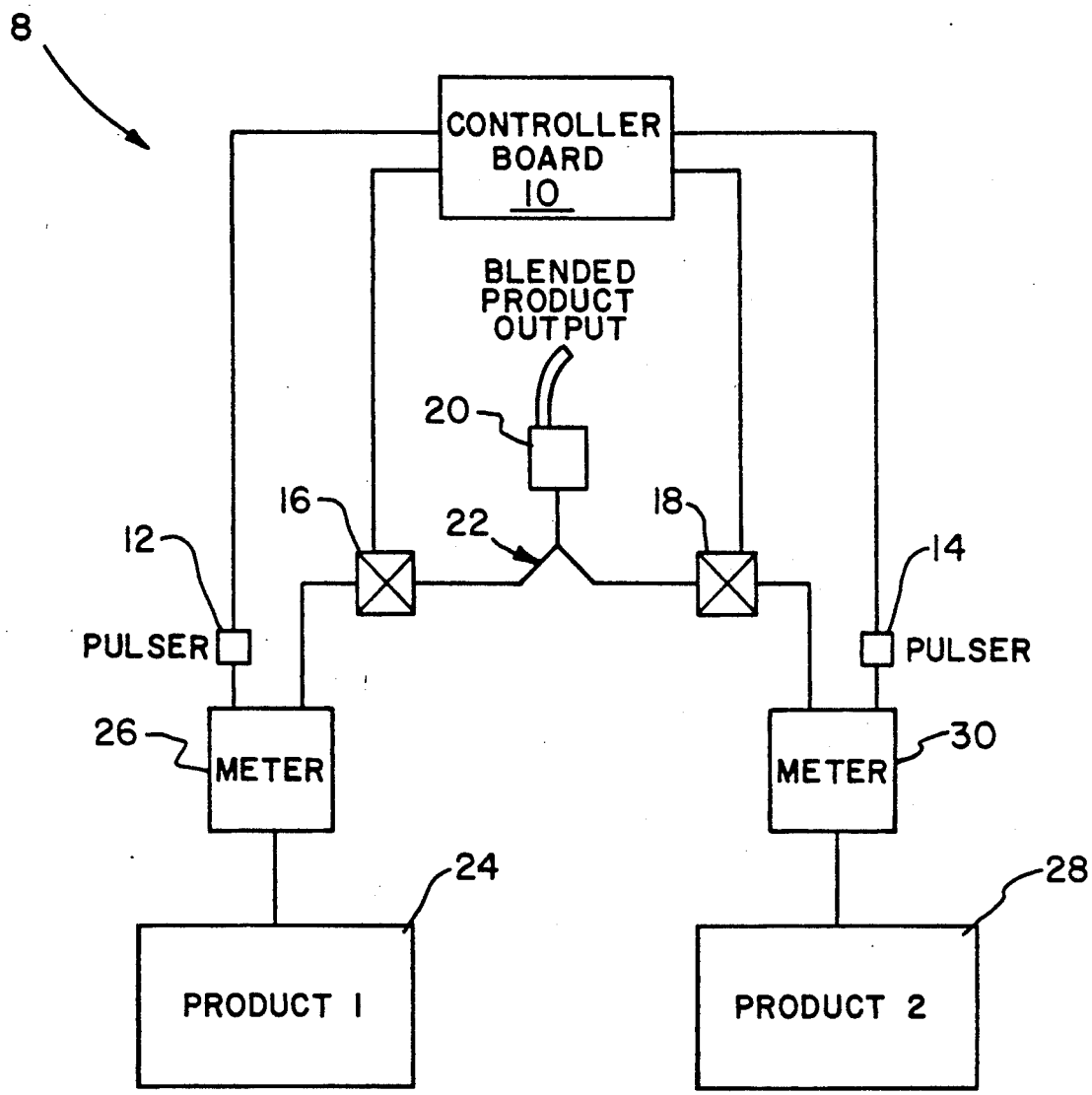
FIG. 1 is a schematic diagram of the variable blending dispenser of the present invention.

Corresponding reference characters indicate corresponding parts throughout the several views. The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Dispenser unit 8 of the present invention is depicted in FIG. 1. Controller board 10 receives signals from pulsers 12 and 14 and operates variable valves 16 and 18. Nozzle 20, via Y connection 22, receives the output of variable valves 16 and 18, mixing and dispensing the component fluids. Variable valve 16 receives its input from supply tank 24, with meter 26 monitoring the volume of fluid supplied to variable valve 16. Pulser 12 is coupled to meter 26 and sends pulses to controller board 10 which represent the volume of fuel flow through valve 16. Correspondingly, supply tank 28 provides fluid input to variable valve 18, with meter 30 measuring the volume of fluid flow through valve 18 and electronically transmitting that volume to controller board 10 via pulser 14. Alternately, the functions of valves 16 and 18 can be combined in a single valve in which one passageway opens while the other closes.

Figure 2:
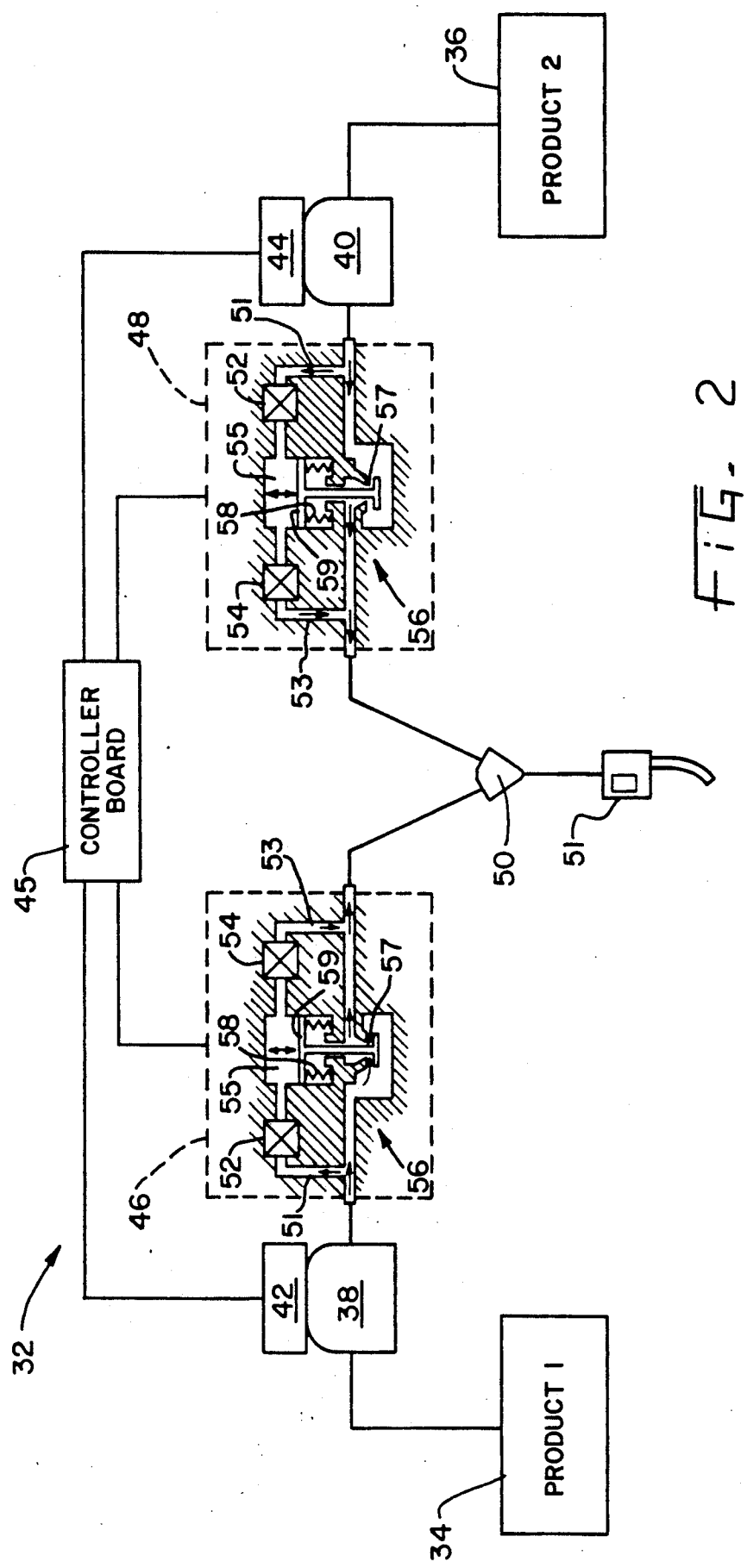
FIG. 2 is a diagram of the preferred embodiment.

The preferred embodiment of the present invention is shown in FIG. 2. Dispenser unit 32 has two sets of supply tanks, meters, and valves coupled to an output nozzle. Specifically, supply tanks 34 and 36 are coupled to meters 38 and 40, respectively. For example, supply tank 34 contains low octane gasoline (Product 1, e.g. 83 octane) and supply tank 36 contains a high octane gasoline (Product 2, e.g. 95 octane). Each of meters 38 and 40, which in the preferred embodiment are positive displacement meters such as piston meters, measures the volume of gasoline supplied by its respective supply tank, and are coupled to pulsers 42 and 44, respectively. To keep a count of the volume of gasoline measured by the respective meters, registers within controller board 45 count pulses received from pulsers 42 and 44 attached to meters 38 and 40. Each pulse represents a predetermined amount of fuel. Variable valve devices 46 and 48 serve as conduits between supply tanks 34 and 36, respectively, and Y connection 50 to provide nozzle 51 with appropriate volumes of component gasolines.

Each variable valve device, 46 and 48, comprises an input solenoid valve 52, output solenoid valve 54, and a bellows valve 56. The bellows valve 56 comprises an auxiliary chamber 55, spring 58, and plunger 59 which extends from chamber 55 to opening 57. The position of plunger 59 of bellows valve 56 determines the volume of fluid allowed to pass to Y connection 50, with the amount of liquid trapped in auxiliary chamber 55 determining the position of plunger 59. The amount of fluid trapped in auxiliary chamber 55 is manipulated by solenoids 52 and 54. One end of input solenoid 52 is connected at 51 to supply tank 34 or 36 near the input side of opening 57 of bellows valve 56 and one end of output solenoid 54 is connected at 53 to Y connection 50 near the output side of opening 57 of bellows valve 56. Auxiliary chamber 55 of bellows valve 56 connects the other ends of solenoids 52 and 54.

Both solenoids 52 and 54 are pulse length activated, remaining open only during the receipt of a pulse signal. Thus the valve stays open longer for longer pulses. If input solenoid 52 is independently opened, fuel enters auxiliary chamber 55 and increases its internal pressure to push down plunger 59 and increase the fuel flow through opening 57 from its associated supply tank to Y connection 50. If output solenoid 54 is independently opened, fuel escapes from auxiliary chamber 55, decreasing its internal pressure allowing spring 58 to force plunger 59 upward to restrict flow through opening 57. When both solenoids 52 and 54 are open, the resulting fuel flow closes opening 57, so the only flow between supply tanks 34 or 36 and Y connection 50 is through solenoid 52, auxiliary chamber 55, and solenoid 54. By controlling the amount of fuel in auxiliary chamber 55, the volume of fuel allowed to pass through valves 46 and 48 to nozzle 51 is accurately controlled. In addition, by keeping input solenoid 52 closed and output solenoid 54 open, auxiliary chamber 55 remains empty so plunger 59 blocks all flow through opening 57, thus making valves 46 and 48 capable of full shut-off. A separate shut-off valve is not needed, which simplifies the design and lowers the cost of manufacture.

A microprocessor (not shown) within controller board 45 is electrically coupled to pulsers 42 and 44. The microprocessor sends pulse signals of predetermined lengths to the solenoids of variable valve devices 46 and 48 based on conditions including the number of pulses received from pulsers 42 and 44, the desired blend ratio, and the desired volume to be dispensed.

To provide a reasonably accurate blending system, different corrective actions are required depending on how far the actual blend has deviated from the desired blend. A method for evaluating and correcting the instantaneous flow rates is the PID algorithm, which stands for Proportional-Integral-Differential algorithm. Error at time t is defined as the difference between the observed ratio and the desired ratio, and is denoted e(t). The PID algorithm calculates a number on which to initiate correction actions, based on a combination of factors which are proportional (P), integral (I), and differential (D) of the error. The correction function at time $t_p$, denoted m($t_p$), is calculated by:

$$m(t_p) = K_p \cdot e(t_p) + K_i \cdot \int_0^{t_p} e(t_p) \, dt + K_d \cdot \frac{d \, e(t_p)}{dt}$$

where:
 m( ) = correction function
 t = particular time
 $K_p$, $K_i$, $K_d$ = proportionality constants
 e( ) = error function The terms $K_p$, $K_i$, and $K_d$ are constants which are determined empirically and optimized. The first component of m($t_p$), the instantaneous blend ratio (P), is a function of the instantaneous error at time $t_p$. The second component, the cumulative blend ratio (I), is a function of the integral summation of the error function values from the beginning of the current session to time $t_p$. The third component, the difference from the previous instantaneous blend ratio (D), is a function of the derivative of the error function at time $t_p$; this differential is calculated as the difference between two successive instantaneous blend ratios divided by the size of the time interval. The time based PID algorithm is difficult to implement for blending since if in a short time interval relatively little fuel is dispensed, the calculated blend ratio is highly inaccurate.

The microprocessor of the present invention uses a volume based PID control algorithm to control the solenoid valves 52 and 54. The volume based PID algorithm is similar to the time based PID algorithm, except that volume is the independent variable. The corrective function at volume $v_p$, denoted m($v_p$), is calculated by:

$$m(v_p) = K_p \cdot e(v_p) + K_i \cdot \int_0^{v_p} e(v_p) \, dv + K_d \cdot \frac{d \, e(v_p)}{dv}$$

where:
 m( ) = correction function
 $v_p$ = particular total volume dispensed
 $K_p$, $K_i$, $K_d$ = Proportionality constants
 e( ) = error function The terms $K_p$, $K_i$, and $K_d$ are constants which are determined empirically and optimized. The independent variable v represents the total volume of dispensed liquids, with that information stored in controller board 45. The error function is calculated using a desired blend ratio which is also stored in controller board 45. The first component (P) of m($v_p$) is a factor of the instantaneous blend error at volume $v_p$, calculated as the instantaneous blend ratio minus the desired ratio. The second component (I) is a factor of the integral summation of the instantaneous blend error values from the beginning of the current session to volume $v_p$. In the present invention, the integral is evaluated by subtracting the cumulative blend ratio from the desired blend ratio. The third component (D) is a factor of the derivative of the error function at volume $v_p$, calculated as the difference between the instantaneous blend ratio error and the previous instantaneous blend ratio error, divided by the magnitude of the volume interval. Under condition of controlled pressure in an actual dispenser environment using submersible pumps and dispensing a minimum of 1.0 gallons, the average accuracy of the blending is to within 0.3%. In a service station with potentially severe fluctuations in pressure, product flow, or other external conditions, the accuracy may fluctuate to a greater extent.

Figure 3:
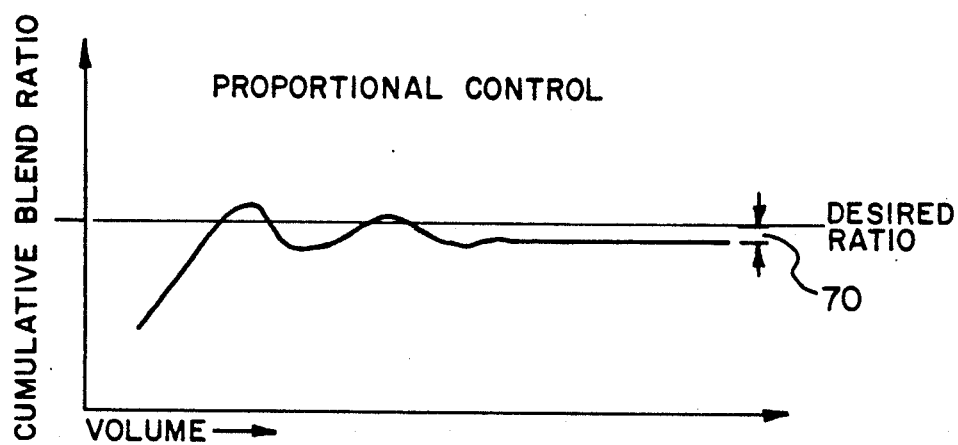
FIGS. 3-5 are graphs of cumulative blend ratio plotted in relation to volume for proportional control, proportional-integral control, and proportional-integral-differential control.
Figure 4:
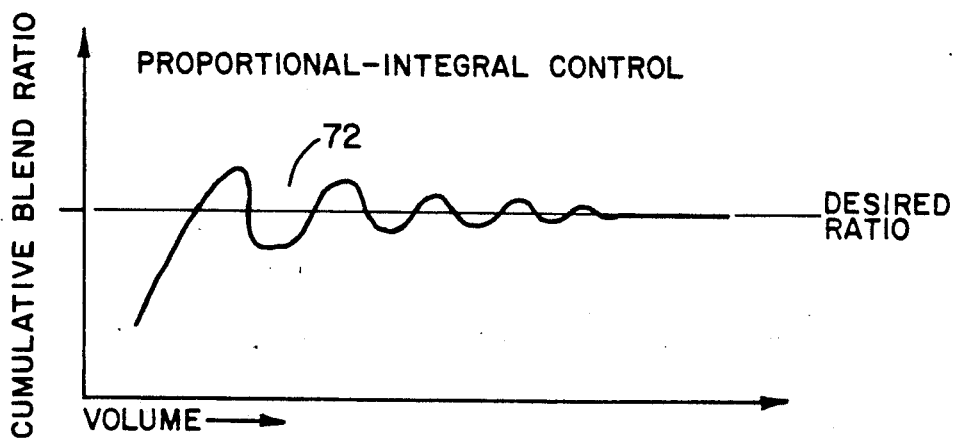
Figure 5:
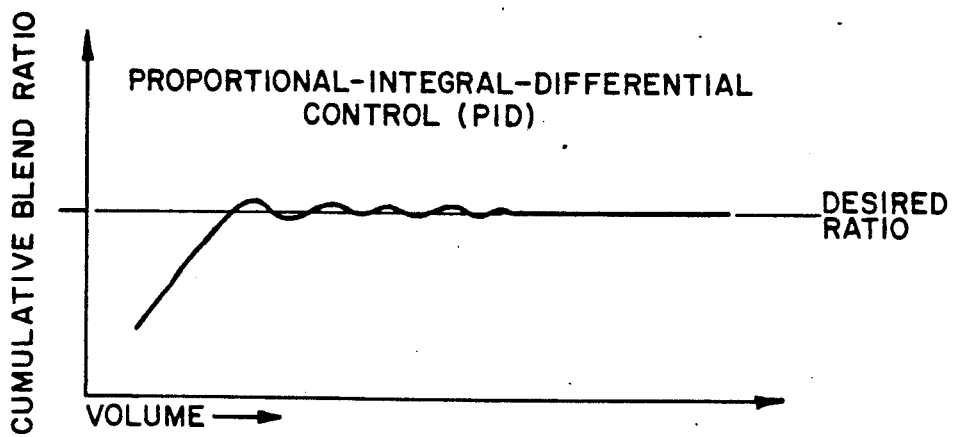

FIGS. 3, 4, and 5 are graphs which show the performance of a volume based proportional control algorithm, a volume based proportional-integral algorithm, and a volume based PID algorithm, respectively. In all three graphs, the horizontal axis represents volume and the vertical axis represents the cumulative percentage blend ratio, with the point marked on the vertical axis representing the desired blend ratio. As volume is dependent upon time, time increases from left to right on the graphs. However, volume is also dependent on flow rate and conditions (e.g., temperature, operator control, and pressure). The present invention achieves its advantages because the values are controlled by reference to volume, rather than time.

The blend ratio is defined to be the volume of a product (e.g. Product 1) divided by the volume of combined products dispensed (e.g. Produce 1+Produce 2). In equation form:

$$\text{Blend Ratio} = \frac{\text{Product 1}}{\text{Product 1} + \text{Product 2}}$$

In FIG. 3, the first measure of the blend ratio occurs some time after zero and steadily increases until it gets to around the desired ratio. After a few oscillations, the cumulative blend ratio curve steadies at a percentage slightly below the desired ratio, creating steady state error 70. In FIG. 4, using a volume based proportional-integral algorithm, the cumulative blend ratio curve has a number of oscillations 72 around the desired blend which eventually settles to nearly exactly the desired blend. In FIG. 5, the cumulative blend ratio curve of the volume based PID algorithm settles at the desired ratio almost immediately, without any major oscillations or steady state error. Thus, the volume based PID algorithm achieves a uniform blending ratio relatively quickly, without a substantial period of oscillation or steady state error.

Figure 6:
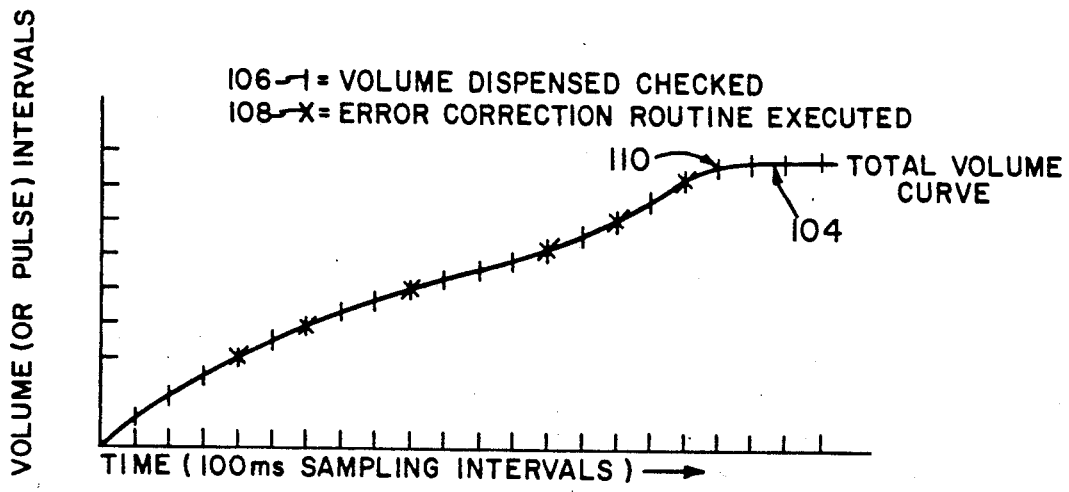
FIG. 6 is a graph of total volume plotted in relation to time showing threshold points of checking and correction.
Figure 7:
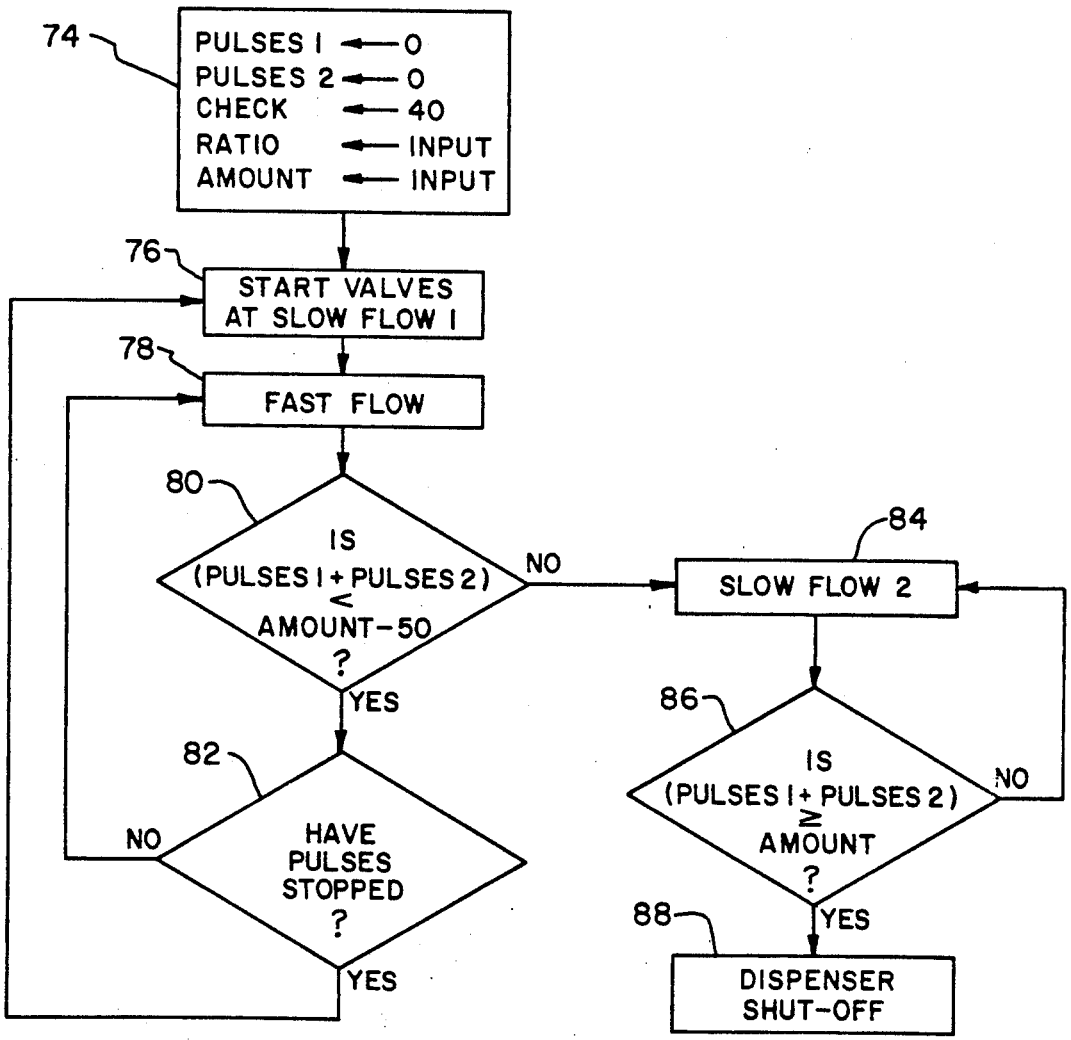
FIGS. 7 and 8 are flow-charts of the operation of the present invention.

The general operation of the present invention is depicted in the flow chart of FIG. 7. Operation begins at initialization step 74 by zeroing the counters (Pulses1 for Product 1, and Pulses2 for Product 2) and initialization the CHECK, RATIO, and AMOUNT variables. In the preferred embodiment, the registers of the meters are not reset, rather the microprocessor records their beginning values and calculates the current values of the variables Pulses1 and Pulses2 as a function of the current register value compared to the initial register value. Normally, this computation is the difference between the two values, however, the registers do roll-over at a certain point, and this roll-over must be accounted for in software. For purposes of explanation, the flow chart of FIG. 6 uses a zeroing of counters.

The variable CHECK represents the accumulated volume at which the PID algorithm is executed to adjust the valves. In the preferred embodiment, CHECK is initialized at 40 so that at least 40 pulses must be counted by the registers before performing the PID algorithm, which at 1,000 pulses per gallon represents 1/25th of a gallon. The variable RATIO represents the percentage blend desired in the current dispensing session. This value is received as an input from the operator of the dispenser, e.g., when the customer presses a button selecting a particular desired blend of fuel. The variable AMOUNT represents the volume of fuel desired to be dispensed. Conventionally, the operator enters the dollar amount of gasoline desired, and the microprocessor converts the dollar amount to a volume. When the total number of pulses equals the number of pulses represented by AMOUNT, the pump is shut off. Also, the operator can omit entering a desired amount, in which case the dispenser will continue to operate until the nozzle is closed and the pump is manually shut off. In this case, the steps in FIG. 7 which compare the number of pulses (Pulses1+Pulses2) to the desired amount (AMOUNT) are omitted.

The dispenser begins supplying fuel at slow flow 1, step 76. In step 76, input and output solenoids 52 and 54 are both open so that fuel flows through auxiliary chamber 55 and not through opening 57 of bellows valve 56. One or the other set of solenoid valves (52 and 54) is alternately opened in order to maintain the desired blend ratio during slow flow. When the microprocessor recognizes that flow has been achieved, it proceeds to begin fast flow step 78. This is also termed "proportional flow" or "variable fast flow".

Fast flow 78 is accomplished by closing both solenoids 52 and 54 in order to trap liquid in auxiliary chamber 55, thus fixing the location of plunger 59. Bellows valve 56 is adjusted by opening either solenoid 52 or 54 for a short period of time to allow the size of auxiliary chamber 55 to change until plunger 59 is in the desired position. Then when solenoids 52 and 54 are closed, liquid is trapped in auxiliary chamber 55, keeping plunger 59 at the desired position to control the area of opening 57 not blocked by plunger 59 and thus keeping the amount of flow steady. After this, the flow may be increased by opening input solenoid 52 for a short period of time, or decreased by opening output solenoid 54 for a short period of time.

In the preferred embodiment, a valve device coupled to the supply tank (e.g. valve device 46) of the higher percentage component fluid is opened fully, and the other valve device (e.g. valve device 48) is then adjusted proportionally. However, at times when the higher percentage component fluid has a low pressure, the microprocessor may determine that valve device 48 connected to the lower percentage component fluid supply tank should be kept fully open and valve device 46 should be adjusted proportionally. In either case, the non-fully open valve is adjusted so that the desired blend ratio is achieved.

Periodically, during fast flow 78, the microprocessor performs offset check step 80. In step 80, the total number of pulses (Pulses1+Pulses2) is compared with the number of pulses needed for the desired amount minus some offset value, which in the preferred embodiment is 50 pulses. If the total number of pulses is less than AMOUNT - 50, stop check step 82 is executed. In step 82, the microprocessor determines whether any additional pulses have been detected since the immediately previous commencement of fast flow step 78. If the microprocessor determines that additional pulses have been detected, then the microprocessor commences fast flow step 78. Alternatively, if the microprocessor determines the pulses have stopped, then it recommences slow flow 1 step 76.

In the preferred embodiment, to minimize wear on the solenoid valves, the microprocessor returns to slow flow 1 step 76 from stop check step 82 only after 5 to 10 seconds have transpired since the last pulse. This additional delay accounts for times when the operator of the nozzle will intermittently turn on and off the liquid flow.

Upon the determination, in offset check step 80, that the total number of pulses is within the offset range (i.e., Pulses1+Pulses2 is no longer less than AMOUNT - 50), then the microprocessor enters slow flow 2, step 84. In step 84, slow flow is accomplished by opening both inlet and outlet solenoids 52 and 54 at the same time, thereby allowing liquid to flow through auxiliary chamber 55. Solenoids 52 and 54 with auxiliary chamber 55 provide a passageway to maintain a flow rate of 1.0 gallon per minute under expected pressure conditions. Slow flow is alternated between valves 46 and 48 as needed to maintain the desired blend ratio. Periodically during slow flow 2, step 84, end check step 86 is executed by the microprocessor. In step 86, the total pulses (Pulses1+Pulses2) is compared to AMOUNT. If the total is less than the desired amount, the microprocessor recommences slow flow to step 84. If the total number of pulses equals or exceeds the desired amount, dispenser shut off step 88 is executed which ends the current session of fuel dispensing.

During each dispensing session, the microprocessor executes an error correction routine. With the present invention, error correction is performed successively after having dispensed predetermined threshold volumes. In the preferred embodiment, the first threshold volume is after 40 pulses are received, and the microprocessor performs the first error correction. Subsequently, threshold volumes are after every 40 additional pulses, with the microprocessor executing the error correction routine after reaching each threshold. An example of the sampling and correcting done during a representative dispensing session is depicted graphically in FIG. 6. Total volume curve 104 represents the sum of Pulses1 and Pulses2 plotted against time in 100 msec intervals. Timer interrupt points 106 along curve 104 show when a timer interrupt occurred, and in this case eighteen occurred including the end of dispensing point 110. However, error correction was not performed at every timer interrupt, but only at correction routine execution points 108. The reason error correction occurred at points 108 is that total volume curve 104 had passed another threshold volume since the last timer interrupt. Thus, the thresholds of the preferred embodiment are at the volumes represented by 40, 80, 120, 160, etc., pulses.

Figure 8:
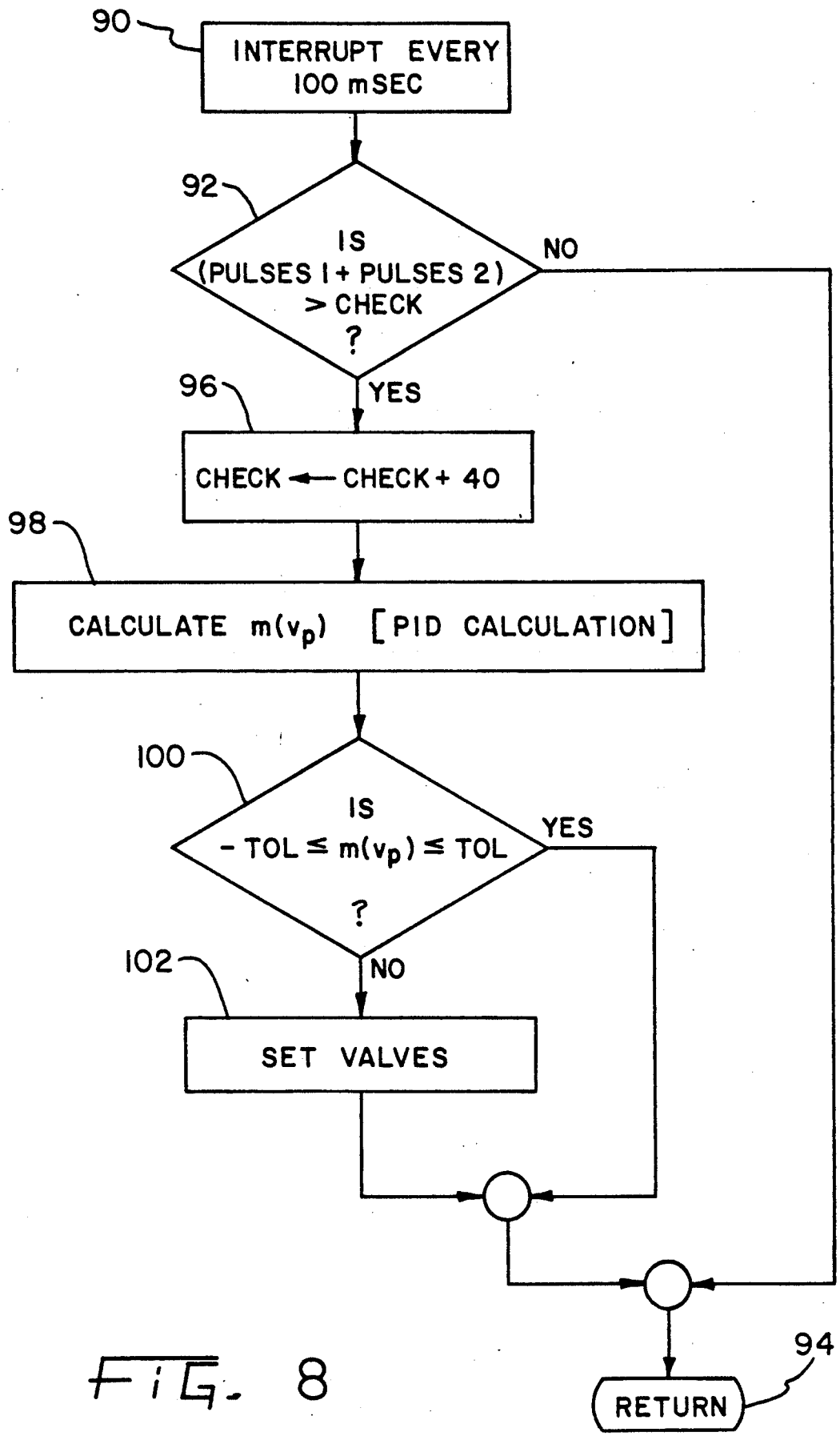

The present invention uses a timer interrupt driven correction algorithm which is shown in the flow chart of FIG. 8. Although having interrupts generated by a total flow counter is possible, the additional circuitry necessary to generate such an interrupt condition adds to the cost of the dispenser. In the present invention, the microprocessor periodically, on a basis of time, checks the counters to determine whether error correction is necessary (i.e. whether a sufficient number of total pulses have been received to justify performing another error correction routine).

In the preferred embodiment, a timer is set to issue an interrupt to the microprocessor every 100 milliseconds, depicted as interrupt step 90 in FIG. 8. The microprocessor then executes volume check 92 which compares the total number of pulses (Pulses1+Pulses2) with the value of the variable CHECK. If the total number of pulses is not greater than the variable CHECK, thus indicating that the volume dispensed has not reached the volume required to initiate another error correction, microprocessor executes return step 94.

However, if the required amount has been reached or surpassed, the microprocessor executes check increment step 96 which adds 40 to the value of the variable CHECK. Then the microprocessor determines the actual instantaneous blend ratio by dividing the number of Product 1 pulses received since the last volume interval by the total pulses received from both products (approximately 40) during the last volume interval. Next, the microprocessor determines the cumulative blend ratio by dividing the value of Pulses1 by the total number of pulses (Pulses1+Pulses2). These values are then used in error calculation step 98 to determine the value of the correction function $m(v_p)$. In error check step 100, the microprocessor determines whether the value of $m(v_p)$ deviates by more than TOL, representing the tolerance of the dispenser. The value of 0.5% for TOL is used in the preferred embodiment, so in step 100 if the absolute value of correction function $m(v_p)$ is less than 0.5% (the value of TOL), the microprocessor executes return step 94, ending the error correction interrupt routine. Using the value of 0.5% for TOL in step 100 produces an average accuracy of 0.3% under tested conditions.

If the value of $m(v_p)$ falls outside of the accepted range, the microprocessor executes valve set step 102. In step 102, the microprocessor sends pulses to the various input and output solenoids 52 and 54 to appropriately control the volume of fuel passing through their corresponding main chambers 57. In the preferred embodiment, the microprocessor sends pulses of various lengths to solenoid valves 52 and 54, the length being determined by the PID correction function $m(v_p)$. In the preferred embodiment, the pulse length is proportional to $m(v_p)$, however a look-up table or similar method can be used. After completing step 102, the microprocessor executes return step 94, thus ending the correction interrupt routine.

The flow chart of FIG. 8 is designed for a dispensing unit which at fast flow supplies at most approximately 25 pulses worth of fluid each 100 milliseconds. However, for different installations differing times and volumes can be used within the spirit and scope of the present invention.

While this invention has been described as having a preferred design, it can be further modified within the teachings of this disclosure. This application is therefore intended to cover any variations, uses, or adaptations of the invention following its general principles. This application is also intended to cover departures from the present disclosure as come within known or customary practice in the art to which this invention pertains and fall within the limits of the appended claims.

What is claimed is:

1. A dispenser for blending component fluids according to a desired cumulative blend ratio, said dispenser comprising:
   a plurality of fluid conduits, each said fluid conduit coupled to one of at least two supplies of component fluid to be dispensed therefor;
   a variable valve means coupled to each said fluid conduit for independently controlling the flow rate at which each said component fluid flows through said respective fluid conduits;
   a flow meter means operatively associated with said fluid conduits for measuring the volume of said component fluid flowing through each said fluid conduit and for providing volume signals representative of said volumes;
   an output means coupled to each said fluid conduit for mixing and dispensing said component fluids; and
   control means for controlling the blending and dispensing of said component fluids, said control means coupled to said flow meter means and said valve means, said control means including selecting means for selection of said desired cumulative blend ratio and comparison means for comparing a calculated ratio of said volume signals with said desired cumulative blend ratio and for determining a corrected blend ratio, said control means further including adjustment means for adjusting said variable valve means in accordance with said corrected blend ratio such that the actual cumulative blend ratio of dispensed component fluids is substantially equal to said desired cumulative blend ratio.

2. The dispenser according to claim 1 wherein said supplies of component fluids comprise a low octane fuel supply and a high octane fuel supply.

3. The dispenser according to claim 1 wherein said volume signals comprise pluralities of pulses, each said pulse representing a predetermined volume of fluid.

4. The dispenser according to claim 1 wherein said variable valve means comprises a bellows valve assembly.

5. The dispenser according to claim 1 wherein said output means comprises a nozzle and a Y connection.

6. The dispenser according to claim 3 wherein said control means includes an accumulation means for accumulating pulses from said flow meter means, and said control means includes a calculating means for calculating said corrected blend ratio by dividing the total pulses representing one said component fuel volume by the total of all pulses received from each said flow meter means.

7. The dispenser according to claim 1 wherein said variable valve means is controlled by variable length pulses.

8. The dispenser according to claim 1 wherein said variable valve means is capable of full shut-off.

9. The dispenser according to claim 1 wherein said flow meter means comprises a plurality of positive displacement piston meters.

10. The dispenser according to claim 1 wherein said control means comprises a microprocessor.

11. A method of blending a plurality of component fluids to provide a desired cumulative blend having a predetermined blend ratio of component fluids, said method comprising:
   providing a blending dispenser including at least two conduits for supplying at least two component fluids to said dispenser, at least two flow meters connected to said conduits for measuring the volume of each said respective supplied component fluid, and valve means for controlling the respective supply flow rate of each said component fluid;
   opening said valve means to initiate a flow of said component fluids in said predetermined ratio to initiate a dispensing operation;

measuring the total volume of each said component fluid dispensed by said dispenser to provide volume measurements;

calculating a calculated blend ratio of said dispensed component fluids from said volume measurements;

comparing said calculated blend ratio with said predetermined blend ratio to determine dispensing error; and adjusting said valve means if said dispensing error is outside a predetermined range.

12. The method according to claim 11 wherein said opening step includes fully opening any one of said conduits, and said adjusting step includes adjusting said other conduits if said calculated ratio and said predetermined ratio are not equal.

13. The method according to claim 11 wherein said calculating, said comparing, and said adjusting steps are performed after dispensing a threshold volume of blended component fluids.

14. The method according to claim 13 wherein the actual amount of said component fluids dispensed is compared to said threshold volume periodically at predetermined time intervals to determine when to perform said calculating, said comparing, and said adjusting steps.

15. The method according to claim 11 wherein said calculated ratio comprises the volume of one of said dispensed component fluids divided by the sum of the volumes of all said dispensed component fluids.

16. The method according to claim 11 wherein said adjusting step comprises sending variable length pulses to said valve means.

17. The method according to claim 16 wherein said pulses sent to said valve means in said adjusting step are determined by a correction function including factors proportional, integral, and differential of said dispensing error as calculated from said volume measurements, said calculating step using said volume measurements rather than time as the independent variable of a PID equation.

18. The method according to claim 11 wherein said calculated ratio is within approximately 0.3% of said predetermined ratio.

19. The method according to claim 11 wherein said opening step comprises a slow flow step and a fast flow step.

20. The method according to claim 19 wherein said opening step begins in said slow flow step, then enters said fast flow step, and only returns to said slow flow step if no fluid flow is measured in said measuring step.

21. The method according to claim 20 wherein returning to said slow flow step only occurs if no fluid flow is detected for a time period in the range of 5 to 10 seconds.

22. In a fuel dispensing installation, a system for mixing and blending component fuels to provide a desired cumulative blend ratio, said system comprising:

a nozzle means for mixing and dispensing said component fuels;

a plurality of variable supply means for providing one of said component fuels to said nozzle means, at least one said variable supply means for each said component fuel, said variable supply means for controlling component fuel flow;

a flow meter means operatively associated with each said variable supply means for measuring the volume of said component fuel flow through said variable supply means and for producing volume signals representative of the volume of said component fuel flow; and a control means for controlling the blending and dispensing of said component fuels, said control means coupled to each said flow meter means and each said variable supply means, said control means including comparison means for comparing a calculated ratio of said volume signals with said desired cumulative blend ratio and for determining a corrected blend ratio, said control means including a selection means for selection of said desired cumulative blend ratio, said control means further including adjustment means for adjusting said variable supply means in accordance with said corrected blend ratio such that the actual cumulative blend ratio of such dispensed component fuels is substantially equal to said desired cumulative blend ratio.

23. The system according to claim 22 wherein said volume signals comprise pluralities of pulses, each said pulse representing a predetermined volume of fuel.

24. The system according to claim 22 wherein said variable supply means comprises a fuel supply tank and a valve means, said valve means comprising a bellows valve assembly.

25. The system according to claim 22 wherein said nozzle means comprises a nozzle and a Y connection.

26. The system according to claim 23 wherein said control means includes an accumulation means for accumulating pulses from each said flow meter means, and said control means includes a calculating means for calculating said corrected blend ratio by dividing total pulses received from said flow meter means associated with one of said component fuels by total pulses received from each said flow meter means.

27. The system according to claim 22 wherein said variable supply means are capable of fully shutting-off said component fuel flow.

28. The system according to claim 22 wherein said variable supply means are controlled by variable length pulses.

29. The system according to claim 22 wherein each said flow meter means comprises a positive displacement piston meter.

30. The system according to claim 22 wherein said control means comprises a microprocessor.

31. A dispenser for blending a lower and higher octane fuel according to a desired cumulative blend ratio, said dispenser comprising:

a lower octane fuel conduit coupled to a supply of lower octane fuel;

a higher octane fuel conduit coupled to a supply of higher octane fuel;

two variable valve means, a first variable valve means coupled to said lower octane fuel conduit and a second variable valve means coupled to said higher octane fuel conduit, said variable valve means for controlling the flow rate at which each fuel flows through said conduits according to variable length pulses received;

two flow meters, a first flow meter operably associated with said first variable valve means and a second flow meter operably associated with said second variable valve means, said first and second flow meters adapted to measure the respective volumes of fuel flowing through said lower and higher octane fuel conduits and for providing volume signals, said volume signals comprising a plurality of pulses;

an output means having a nozzle and a Y connection, said output means for mixing and blending said fuels and for starting and stopping said dispenser; and electronic circuitry including a microprocessor and associated circuitry for controlling the blending and dispensing of said fuels, said electronic circuitry coupled to said first and second variable valve means and coupled to said first and second flow meters, said electronic circuitry including circuitry for comparing a calculated ratio of said volume signals with said desired cumulative blend ratio and for determining a correction function, said electronic circuitry including circuitry for selecting said desired cumulative blend ratio, said electronic circuitry further including circuitry for adjusting said variable valve means in accordance with said correction function by sending variable length pulses to said first and second variable valve means such that the actual cumulative blend ratio of such dispensed fuel is substantially equal to said desired cumulative blend ratio.

32. The dispenser of claim 31 wherein each of said first and said second variable valve means comprises a bellows valve assembly.

33. The dispenser of claim 31 wherein said electronic circuitry includes circuitry for accumulating pulses from said first and said second second flow meters, and said electronic circuitry includes circuitry for calculating said corrected blend ratio by dividing the total pulses received from one of said first and said second flow meters by the total pulses received from both of said first and said second flow meters.

34. The dispenser of claim 31 wherein each of said first and second flow meters comprises a positive displacement piston meter.

35. The dispenser of claim 31 wherein each of said first and second variable valve means is capable of full shut-off.

* * * * *